United States Patent
Stout et al.

(10) Patent No.: US 7,508,812 B2
(45) Date of Patent: Mar. 24, 2009

(54) SOCKET MANAGEMENT FOR ALWAYS-ON DATA CONNECTIONS

(75) Inventors: Craig Stout, Ottawa (CA); Robbie J. Maurice, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 505 days.

(21) Appl. No.: 11/044,189

(22) Filed: Jan. 28, 2005

(65) Prior Publication Data

US 2006/0171306 A1    Aug. 3, 2006

(51) Int. Cl.
*H04J 3/24*    (2006.01)
(52) U.S. Cl. .................. 370/349; 455/510; 455/445; 455/466; 455/450; 455/401; 370/392; 370/241; 370/292; 370/401; 709/249; 709/204; 709/224; 709/247
(58) Field of Classification Search .......... 455/67.11, 455/445, 510, 466, 450, 414.2, 401; 70/392; 709/249, 204, 224, 726, 247; 370/241, 392, 370/401; 710/104; 109/224
See application file for complete search history.

(56) References Cited

U.S. PATENT DOCUMENTS

| 6,748,434 B2* | 6/2004 | Kavanagh | 709/224 |
|---|---|---|---|
| 7,010,303 B2* | 3/2006 | Lewis et al. | 455/445 |
| 7,197,312 B2* | 3/2007 | Gunaratnam et al. | 455/445 |
| 2002/0142774 A1* | 10/2002 | Saint-Hilaire et al. | 455/445 |
| 2002/0150050 A1* | 10/2002 | Nathanson | 370/241 |
| 2003/0055954 A1* | 3/2003 | Kavanagh | 709/224 |
| 2003/0064726 A1* | 4/2003 | Bae | 455/445 |
| 2003/0081607 A1* | 5/2003 | Kavanagh | 370/392 |
| 2003/0103506 A1* | 6/2003 | Keller | 370/392 |
| 2003/0126328 A1* | 7/2003 | Reilly | 710/104 |
| 2003/0187926 A1* | 10/2003 | Karjanlahti | 709/204 |
| 2003/0208628 A1* | 11/2003 | Karjanlahti | 709/249 |
| 2005/0003765 A1* | 1/2005 | Alfano et al. | 455/67.11 |
| 2005/0091409 A1* | 4/2005 | Williams et al. | 709/247 |
| 2005/0227720 A1* | 10/2005 | Gunaratnam et al. | 455/510 |
| 2006/0009243 A1* | 1/2006 | Dahan et al. | 455/466 |

* cited by examiner

*Primary Examiner*—Rafael Pérez-Gutiérrez
*Assistant Examiner*—Joseph Arévalo

(57) ABSTRACT

A method of automatically keeping sockets open for always-on applications in a GPRS context is provided. Information is maintained by each wireless device identifying each APN (access point name)-port pair associated with a PDP (packet data protocol) context used by an always-on application. Upon the PDP context becoming available after having become unavailable, a socket is registered for each port-APN pair associated with the PDP context.

18 Claims, 4 Drawing Sheets

SOCKET MANAGEMENT FOR ALWAYS-ON DATA CONNECTIONS

FIELD OF THE INVENTION

The invention relates to always-on data connections.

BACKGROUND OF THE INVENTION

A GPRS (general packet radio service) always-on wireless device typically has a single external connection and maintains a single PDP (packet data protocol) context. An always-on device does everything that it can to keep its connection up all the time, at least while it is instructed to do so. An example of a method of keeping a PDP context up all the time is taught in commonly assigned co-pending U.S. application Ser. No. 10/987,658 entitled "Data-Capable Network Prioritization with Reject Code Handling". That application is hereby incorporated by reference in its entirety.

For an always-on device that only has a single PDP context and a single application, maintaining the PDP context alone is sufficient to maintain data connectivity for the always-on device. Thus, when the PDP context fails, mechanisms such as those taught in the above-referenced patent application can be implemented to re-establish the PDP context and thereby re-establish the data connectivity with the single application. As abstract example of this is shown in FIG. 1 where there is shown a GPRS always-on device 10 having a single PDP context 12 that maps one-to-one to the device and single application. As such, so long as the device is able to maintain the PDP context, data connectivity to the device is continuous.

Typically data applications are not always-on. For example, some e-mail applications are only activated upon user command. Once activated, the application causes a PDP context to be created, opens a socket and maps the socket to the PDP context. The work concerning the e-mail is completed and then the PDP context and socket are closed. Similar behaviour is implemented to open a socket when web browsing is conducted using a wireless device. Typically, a timer is started after the last user action. When the timer expires (or the application is closed), the PDP context and socket are closed.

SUMMARY OF THE INVENTION

According to one broad aspect, the application provides a method in a wireless device comprising: maintaining information identifying each APN (access point name)-port pair associated with a PDP (packet data protocol) context used by an always-on application; and upon the PDP context becoming available after having become unavailable, registering a socket for each port-APN pair associated with the PDP context.

In some embodiments, the method comprises executing the maintaining and registering for each of a plurality of PDP contexts each used by at least one always-on application.

In some embodiments, the method further comprises: automatically maintaining the PDP context associated with an always-on application; detecting when the PDP context is no longer available; detecting when the PDP context is again available.

In some embodiments, the method further comprises: for each APN-port pair of an active context maintaining a respective socket identifier; upon the PDP context becoming unavailable, closing the socket having the respective socket identifier for each APN-port pair associated with the PDP context.

In some embodiments, the maintaining information comprises: when registering a new port for a given APN, adding an APN-port pair to a list of APN-port pairs; when de-registering a port for a given APN, removing the APN-port pair from the list.

In some embodiments, the method further comprises: when de-registering an entire APN, closing a socket for each port-APN pair if the PDP context is available and removing each APN-port from the information.

In some embodiments, upon receipt of a request to register a new port for a given APN, if the PDP context is available, applying registration for the APN-port pair.

In another embodiment, a computer readable medium having instructions stored thereon for execution by a wireless device, the instructions comprising an always-on application is adapted to implement one of the methods as summarized above.

In another embodiment, a wireless device is provided that is adapted to implement one of the methods summarized above.

According to another broad aspect, the application provides a wireless device comprising: a socket layer; an always-on application adapted to implement one of the above summarized methods, wherein the registering comprises registering the socket with the socket layer.

According to another broad aspect, the application provides a wireless device comprising: a socket layer; at least one always-on application adapted to implement one of the above summarized methods, wherein the registering comprises registering the socket with the socket layer; at least one intermittent application.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
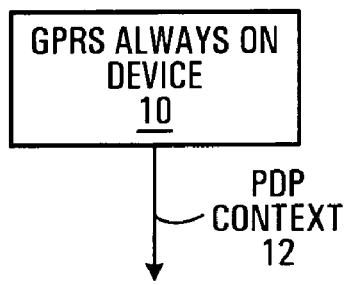
FIG. 1 is a block diagram of a conventional GPRS always-on device.
Figure 2:
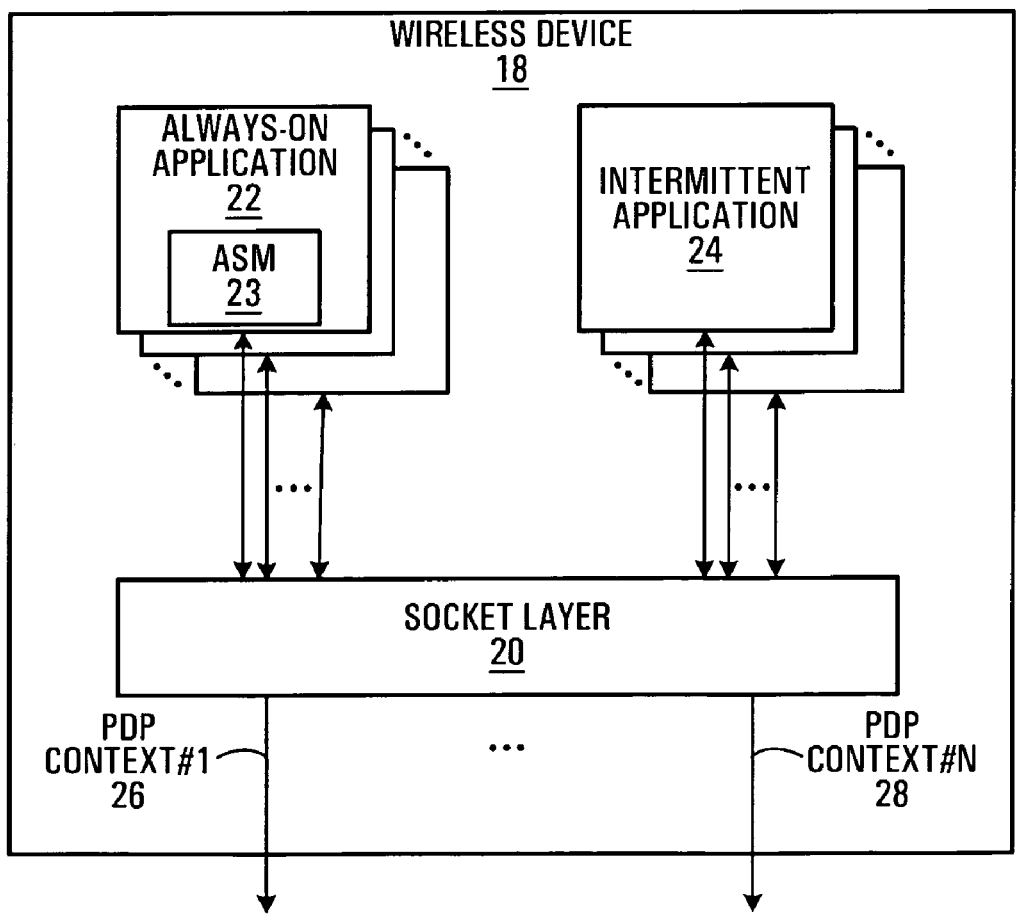
FIG. 2 is a block diagram of a wireless device provided by an embodiment of the application.

A wireless device provided by an embodiment of the application will now be described with reference to FIG. 2. The wireless device, generally indicated by 18, includes a socket layer 20 that supports a plurality of PDP contexts including PDP context #1 26, ..., PDP context #N 28. Each of these PDP contexts typically represents a separate logical interface. Also shown are one or more always-on applications 22. At least one of the always-on applications 22 includes an ASM (Automatic Socket Manager) 23. Some implementations may feature additional intermittent applications 24.

An APN (access point name) is a network identifier to which a connection may be established on a GPRS network. The set of information that describes such a connection is called the PDP (packet data protocol) context.

It is to be understood that the wireless device 18 would also include the remainder of the functionality necessary for such a device to operate. Only the bare minimum functionality required to describe the embodiment has been shown. Typically the always-on applications 22 and intermittent applications 24 are implemented in software but hardware implementations are not to be ruled out. The socket layer 20 may be implemented in software or hardware or a combination of hardware and software.

An example of an always-on application 22 that might be implemented in wireless device 18 includes "push" email services. Examples of intermittent applications include "pull" email and web browsing.

The socket layer 20 has a plurality of ports. Typically these include TCP (transmission control protocol) ports and UDP (user datagram protocol) ports. For example, web browsing uses a port on TCP. Published ports having particular port numbers are often reserved for certain applications. The socket layer 20 is typically managed by an operating system of the device (not shown).

Each packet received by the wireless device 18 is received with a header that indicates a port number, this being a logical port on the device. The socket layer 20 takes data from the physical connection(s), and uses the port number to determine where the packet needs to go. Applications (both the always-on applications and intermittent applications) register with the socket layer to request a socket. The socket layer then binds a socket to a particular protocol/port combination. For example, TCP port 80 is typically used for web traffic. Once this binding has taken place, the application is able to communicate using the physical interfaces.

In some implementations, an application may use multiple PDP contexts, and/or multiple applications may use the same PDP context. In the latter case the device operating system ensures only one application is allowed to bind to any given port/protocol combination.

When one of the PDP contexts 26, 28 fails, all of the associated sockets become invalid. From that point on, the application that used the PDP context cannot receive anything and cannot send anything using the socket. After recovery of the PDP context, for example using the method described in the above-referenced co-pending application, the always-on application 22 still will not be able to communicate until it creates new sockets. It is noted that for the intermittent application 24, the fact that the PDP context goes down is less relevant since it is designed to deal intermittently with the PDP context. However, if the PDP context does go down while the intermittent application 24 is active, then it too will need to re-establish its sockets before it can continue communicating these in the physical interfaces. However, for such applications typically it will be up to the user to re-initiate the intermittent application. This will result in a new PDP context and new sockets being created.

An embodiment of the application provides an automated method for the always-on application 22 to re-establish the sockets after the PDP context has been re-established. The particular functionality for achieving this is summarised as the automatic socket manager 23 in FIG. 2. This is preferably implemented in software as part of the always-on application but other implementations are also contemplated.

Figure 3:
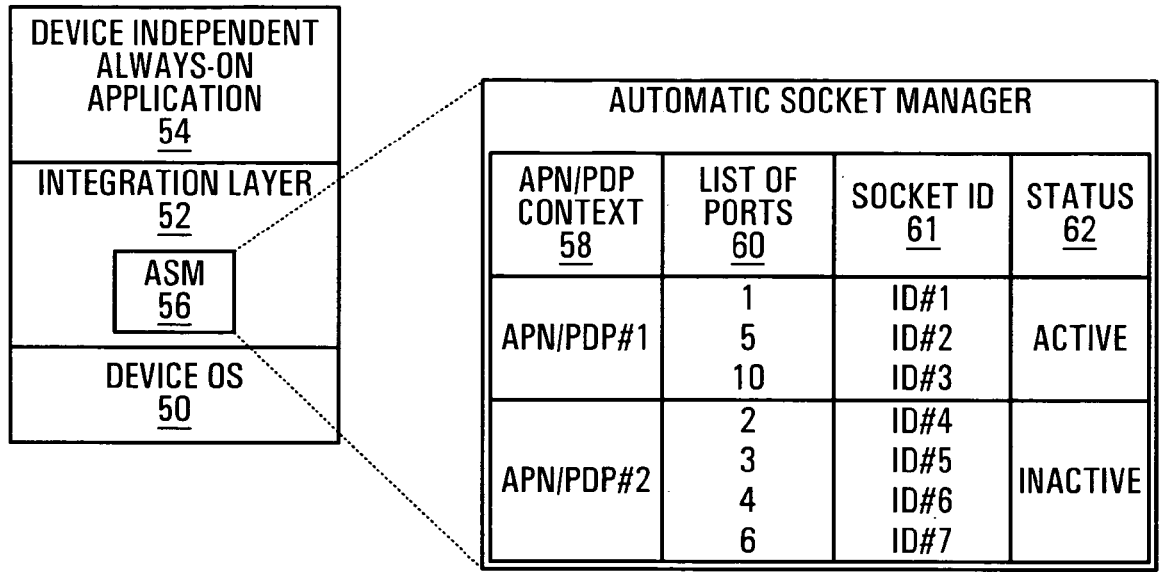
FIG. 3 is a layer view of a wireless device provided by an embodiment of the application.

Referring now to FIG. 3, shown is a different view of a wireless device within which the automatic socket manager can be implemented. The device has a device operating system 50 and a device independent always-on application 54. Between these is an integration layer 52 that allows the device independent always-on application 54 to communicate with the device OS (operating system) 50. The integration layer 52 contains an automatic socket manager 56. It is noted that the socket API is between the device operating system 50 and the integration layer 52. The automatic socket manager 56 maintains a list of APN (access point name)/PDP contexts 58 relevant to the particular application, and for each such APN/PDP context maintains a respective list of ports 60. The illustrated example also includes a status 62 for each APN/PDP context indicating whether or not the APN/PDP context is available. In one example, the availability is indicated by maintaining the PDP state of the PDP context. In the details below; PDP state is used to indicated the availability/unavailability of the PDP context. However, the ASM may alternatively maintain its own information on this. For example, a single binary flag can be used to indicate availability/unavailability. When an APN is first registered, the PDP state is "INIT". When the PDP context activates, the PDP state is set to "ACTIVE". When the PDP context deactivates, the PDP state is set to "INACTIVE". Also it is possible for the activation to fail in which case the PDP state is "REJECTED". The combination of an APN/PDP and a port in the list of ports 62 will be referred to as an APN-port pair. Also shown for each APN-port pair of an active PDP context is a socket identifier 61. These socket identifiers are needed when it is time to apply de-registrations. There are no sockets for an inactive PDP context.

While the example of FIG. 3 shows a very specific way of storing APN-port pair information, it is to be understood that other structures (any appropriate information store) and methods of maintaining this information may alternatively be employed.

Examples of methods by which the automatic socket manager 56 or the ASM 23 of FIG. 2 uses such data to perform automatic socket management will be described below in detail with respect to FIGS. 5 through 8.

For the embodiment of FIG. 3, it is the device independence of always-on application 54 that necessitates an integration layer, and the ASM 56 has been included in the integration layer 52 in the particular example.

Figure 4:
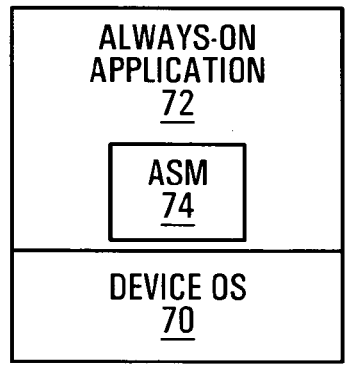
FIG. 4 is a layer view of another wireless device provided by an embodiment of the application.

FIG. 4 shows another wireless device in which there is a device operating system 70 upon which is running an always-on application 72 containing an automatic socket manager 74. The layered breakdowns of FIGS. 3 and 4 provide two specific examples of locations where the ASM might be implemented. More generally, an ASM can be implemented in any appropriate place within the wireless device that allows it to manage sockets on behalf of an always-on application.

Figure 5:
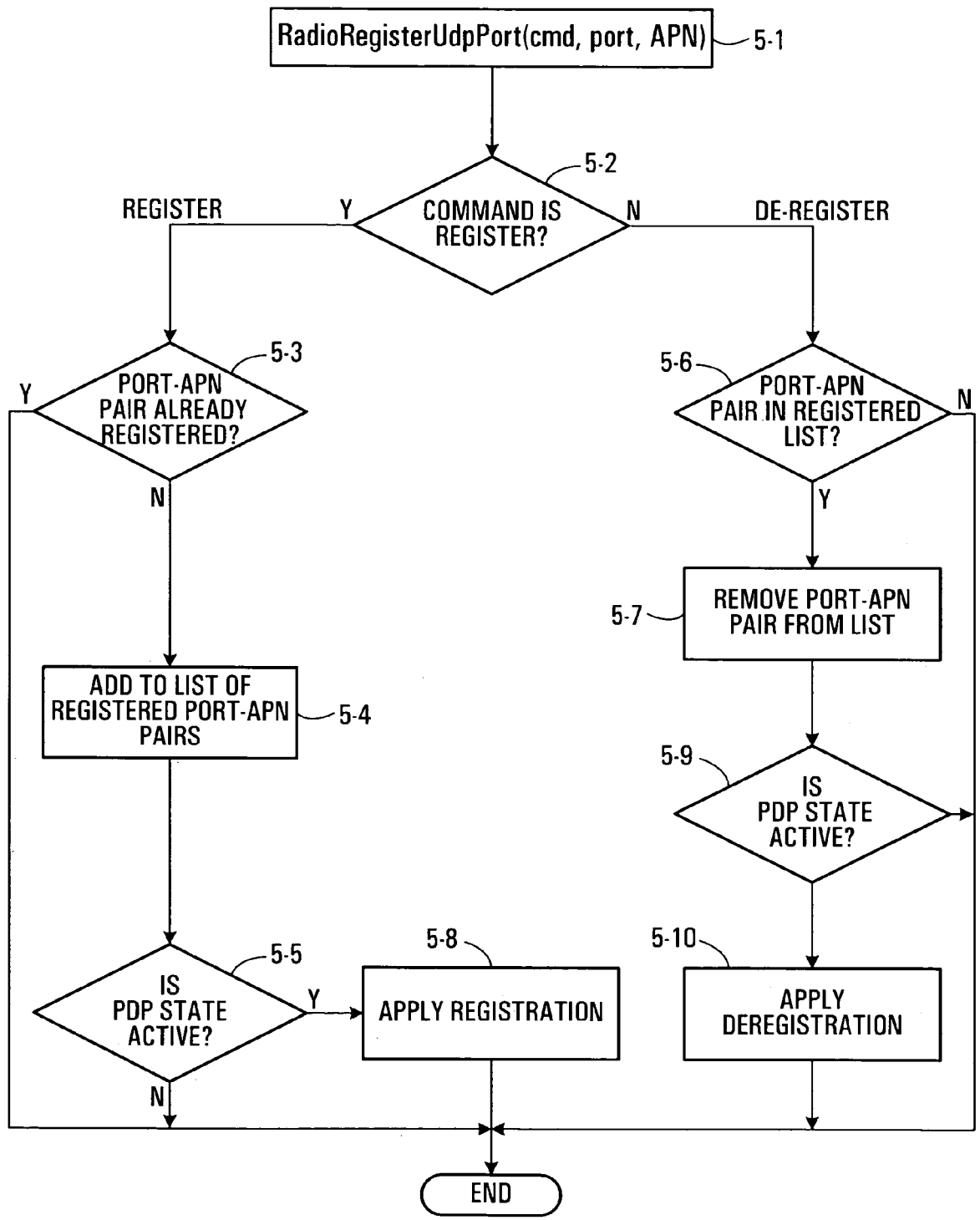
FIG. 5 is a flowchart of a method of maintaining a list of APN-port pairs.

Referring now to FIG. 5, shown is a first method that may be implemented by an automatic socket manager to maintain a list of registered port-APN pairs. The method begins at step 5-1 with the occurrence of a RadioRegisterUdpPort action. RadioRegisterUdpPort is an action taken by the application. The command is a parameter provided by the application. The command may be a register command or a de-register command. Further parameters include a port number and an APN. Note that there is a one-to-one mapping between APNs and PDP contexts. In the event the command is a register command (yes path, step 5-2) then at step 5-3 a check is made to see if the port-APN pair has already been registered. If so (yes path, step 5-3) the method ends for that particular command. Otherwise, if the port-APN pair is not already registered (no path, step 5-3) then the port-APN pair is added to the list of registered port-APN pairs at step 5-4. If the PDP state is active at that time (yes path, step 5-5) then the registration is applied at step 5-8. If the PDP state is not active (no path, step 5-5) then the registration is not applied, but it has still been added to the list of registered port-APN pairs.

If the command was not a register command (no path, step 5-2) then it is a de-register command, and a check is made at step 5-6 to see if the port-APN pair is in the registered list. If it is not in the list (no path, step 5-6) then nothing further needs to be done. On the other hand, if it is in the list (yes path, step 5-6) then the port-APN pair is removed from the list at step 5-7 and in the event the PDP state is active (yes path, step 5-9) the de-registration is applied at step 5-10. The socket identifier is also stored in association with the port-APN pair.

The first step in the flow chart of FIG. 5 amounts to a declaration of interest for a particular port and a particular APN for UDP. This might occur when the device is initially turned on, or at some later time when the application decides that it is interested in receiving data. A pre-condition to this is that the PDP context and APN have become associated. This can be achieved, for example, with a radio register APN command, resulting in the creation of a PDP context associated to that APN, if one does not already exist.

It can be seen that the flow chart of FIG. 5 accommodates the processing of requests for new ports and for the removal of existing ports. The list of port-APN pairs that is maintained survives PDP context failures and survives the subsequent invalidation of all the sockets associated with the PDP contexts. As such, this information can be used to re-establish the sockets after the failure of a particular PDP context.

Figure 6:
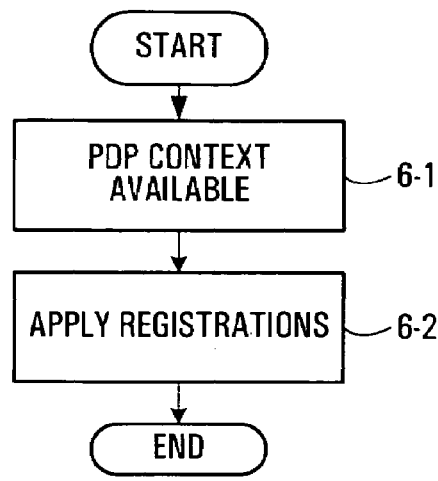
FIG. 6 is a flowchart of a method of re-establishing sockets after a PDP context becomes available.

The steps executed to re-establish the sockets after the failure of the PDP context are indicated in the flow chart of FIG. 6. The method begins with the receipt of a message indicating that the PDP context is available again at step 6-1 or otherwise becoming aware that the PDP context is available. Then, at step 6-2 for each registered port-APN pair associated with the PDP context, the registration is applied to set up a new socket for that port-APN pair. The socket identifier is stored in association with the port-APN pair. At the end of the method of FIG. 6, all of the sockets will have been re-established. It is noted that in the event a request for an additional socket had been received during the period that the PDP context was down, a registration for that is also applied.

Figure 7:
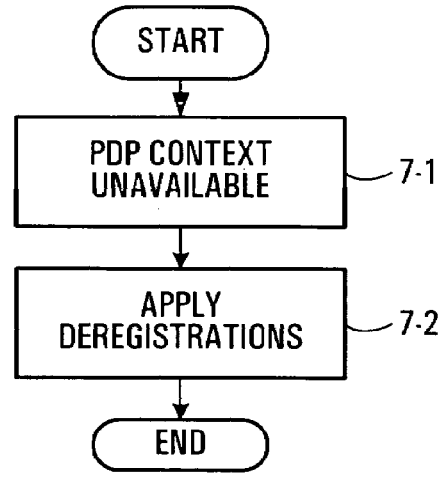
FIG. 7 is a flowchart of a method of de-registering sockets after a PDP context becomes unavailable.

Referring now to FIG. 7, shown is a flow chart of method steps executed when the PDP context becomes unavailable. The method begins at step 7-2 with the receipt of a message or other indication that the PDP context has become unavailable. At step 7-2, for each of the port-APN pairs in the list for that particular PDP context, a de-registration is applied to the socket having the associated socket identifier. Thus, at the end of the method of FIG. 7, de-registrations have been applied for each of the port-APN pairs associated with the PDP context that has become unavailable. Applying the de-registrations means closing the sockets.

Figure 8:
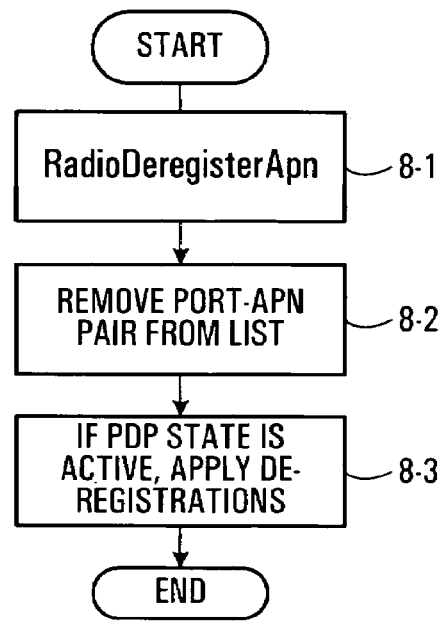
FIG. 8 is a flowchart of a method of de-registering all of the ports associated with a given APN.

Referring now to FIG. 8, shown is a flow chart of method steps executed by the automatic socket manager when it is time to de-register all of the ports associated with a given APN. This might occur, for example, if the user has made a configuration change to the application, or if the application is about to close. The method begins with the receipt of a message or other indication that it is time to de-register a given APN at step 8-1. This is followed by steps 8-2 and 8-3 that are executed for each port on that APN. At step 8-2 the port-APN pair is removed from the list and at step 8-3 the de-registration is applied to the associated socket if the PDP state is ACTIVE. Thus, at the end of the method of FIG. 8 all of the ports for the selected APN will have been de-registered, and the list maintained by the automatic socket manager will be empty for that particular APN.

The embodiments described have been particular to GPRS applications employing PDP context and APNs. It is to be understood that standards evolve, details on the GPRS standard and evolutions thereof can be found at www.3gpp.com. Embodiments apply to the current standard, past standard, and future evolutions of the standard.

More generally, in another embodiment, an always-on application makes use of a set of one or more sockets in association with a data service, and is responsible for setting up new sockets when the data service fails and is then re-established. The specific embodiments described use the APN/PDP context mechanism to identify data services but it is to be understood other mechanisms may alternatively be employed both for GPRS applications and non-GPRS applications. The methods employed in such embodiments may be very similar to those described for the GPRS case. An ASM maintains an identification of the sockets used by the always-on application that are associated with a particular data service. When the data service fails, the sockets are de-registered; when the data service is re-established, new sockets are established for the always-on application to communicate via the data service.

Numerous modifications and variations of the present invention are possible in light of the above teachings. It is therefore to be understood that within the scope of the appended claims, the invention may be practiced otherwise than as specifically described herein.

We claim:

1. A method in a wireless device comprising:
   maintaining information identifying each APN (access point name)-port pair associated with a PDP (packet data protocol) context used by an always-on application; and
   upon the PDP context becoming available after having become unavailable, registering a socket for each APN-port pair associated with the PDP context based upon the information identifying each APN-port pair associated with a PDP context.

2. The method of claim 1 comprising executing the maintaining and registering for each of a plurality of PDP contexts each used by at least one always-on application.

3. The method of claim 1 further comprising:
   automatically maintaining the PDP context associated with an always-on application;
   detecting when the PDP context is no longer available; and
   detecting when the PDP context is again available.

4. The method of claim 1 further comprising:
   for each APN-port pair of an active context maintaining a respective socket identifier; and
   upon the PDP context becoming unavailable, closing the socket having the respective socket identifier for each APN-port pair associated with the PDP context.

5. The method of claim 1 wherein the maintaining information comprises:
   when registering a new port for a given APN, adding an APN-port pair to a list of APN-port pairs; and
   when de-registering a port for a given APN, removing the APN-port pair from the list.

6. The method of claim 5 wherein upon receipt of a request to register the new port for the given APN, if the PDP context is available, applying registration for the APN-port pair.

7. The method of claim 1 further comprising:
   when de-registering an entire APN, closing the socket for each APN-port pair if the PDP context is available and removing each APN-port pair from the information.

8. A computer readable medium having instructions stored thereon for execution by a wireless device, the instructions comprising an always-on application configured to:
- maintain information identifying each APN (access point name)-port pair associated with a PDP (packet data protocol) context used by an always-on application; and
- upon the PDP context becoming available after having become unavailable, register a socket for each APN-port pair associated with the PDP context based upon the information identifying each APN-port pair associated with a PDP context.

9. A wireless device comprising:
a socket layer;
an always on application;
an automatic socket manager;
the automatic socket manager being configured to maintain in an information store information identifying each APN (access point name)-port pair associated with a PDP (packet data protocol) context used by the always-on application; and
wherein upon the PDP context becoming available after having become unavailable, the automatic socket manager registers a socket with said socket layer for each APN-port pair associated with the PDP context based upon the information identifying each APN-port pair associated with a PDP context.

10. The wireless device of claim 9 wherein:
the information store is used to maintain information identifying each APN (access point name)-port pair associated with each of a plurality of PDP (packet data protocol) contexts used by the always-on application; and
upon one of the PDP contexts becoming available after having become unavailable, the automatic socket manager registers a socket for each APN-port pair associated with the PDP context that became unavailable.

11. The wireless device of claim 9 wherein the automatic socket manager is further configured to:
for each APN-port pair of an active context, maintain a respective socket identifier; and
upon the PDP context becoming unavailable, close the socket having the respective socket identifier for each APN-port pair associated with the PDP context.

12. The wireless device of claim 9 wherein the information is maintained by:
when registering a new port for a given APN, adding an APN-port pair to a list of APN-port pairs; and
when de-registering a port for a given APN, removing the APN-port pair from the list.

13. The wireless device of claim 9, wherein the automatic socket manager is further configured to:
when de-registering an entire APN, closing a socket for each APN-port pair if the PDP context is available and removing each APN-port pair from the information.

14. A wireless device comprising:
a socket layer;
an always-on application configured to:
maintain information identifying each APN (access point name)-port pair associated with a PDP (packet data protocol) context used by an always-on application; and
upon the PDP context becoming available after having become unavailable, register a socket for each APN-port pair associated with the PDP context based upon the information identifying each APN -port pair associated with a PDP context.
wherein register a socket comprises register the socket with the socket layer.

15. The wireless device of claim 14 further comprising:
at least one intermittent application.

16. A method in a wireless device comprising:
for each of at least one data service used by an always-on application, maintaining information identifying each socket used by the always-on application in using the data service; and
upon one of the data services becoming available after having become unavailable, registering a new socket for each socket used by the always-on application, based upon the information identifying each APN-port pair associated with a PDP context, in using the data service.

17. A computer readable medium having instructions stored thereon for execution by a wireless device, the instructions comprising an always-on application configured to:
for each of at least one data service used by an always-on application, maintain information identifying each socket used by the always-on application in using the data service; and
upon one of the data services becoming available after having become unavailable, register a new socket for each socket used by the always-on application, based upon the information identifying each APN-port pair associated with a PDP context, in using the data service.

18. A wireless device configured to:
for each of at least one data service used by an always-on application, maintain information identifying each socket used by the always-on application in using the data service; and
upon one of the data services becoming available after having become unavailable, register a new socket for each socket used by the always-on application, based upon the information identifying each APN -port pair associated with a PDP context, in using the data service.

* * * * *